(12) United States Patent
Stier

(10) Patent No.: US 6,631,854 B1
(45) Date of Patent: Oct. 14, 2003

(54) FUEL INJECTION VALVE

(75) Inventor: Hubert Stier, Asperg (DE)

(73) Assignee: Robert Bosch GmbH, Stuttgart (DE)

( * ) Notice: Subject to any disclaimer, the term of this patent is extended or adjusted under 35 U.S.C. 154(b) by 144 days.

(21) Appl. No.: 09/806,893

(22) PCT Filed: Aug. 3, 2000

(86) PCT No.: PCT/DE00/02618

§ 371 (c)(1),
(2), (4) Date: Jul. 9, 2001

(87) PCT Pub. No.: WO01/11223

PCT Pub. Date: Feb. 15, 2001

(30) Foreign Application Priority Data

Aug. 5, 1999 (DE) .......................... 199 36 942

(51) Int. Cl.[7] .............................. B05B 1/08; B05B 3/04; B05B 1/30; F02M 51/00; A62C 31/02
(52) U.S. Cl. ............................... 239/102.1; 239/585.1; 239/585.4; 239/585.5; 239/601
(58) Field of Search ............................... 239/87, 102.1, 239/88, 102.2, 89, 90, 91, 93, 95, 97, 98, 533.2, 533.3, 533.7, 533.9, 533.12, 533.14, 585.1, 585.3, 585.4, 585.5, 601; 251/127, 129.15, 129.21

(56) References Cited

U.S. PATENT DOCUMENTS

| | | | |
|---|---|---|---|
| 4,200,237 A | | 4/1980 | Urlaub et al. |
| 4,275,845 A | * | 6/1981 | Muller .................... 239/533.12 |
| 4,408,722 A | * | 10/1983 | Frelund ..................... 239/453 |
| 4,867,128 A | * | 9/1989 | Ragg et al. .................. 123/531 |
| 5,533,482 A | * | 7/1996 | Naitoh ........................ 123/305 |
| 5,662,277 A | * | 9/1997 | Taubitz et al. ............ 239/585.4 |
| 5,823,444 A | * | 10/1998 | Reiter et al. ............ 239/533.12 |

FOREIGN PATENT DOCUMENTS

| | | |
|---|---|---|
| DE | 28 41 967 | 4/1980 |
| DE | 40 05 455 | 8/1990 |
| DE | 44 34 892 | 4/1996 |

* cited by examiner

Primary Examiner—Davis Hwu
(74) Attorney, Agent, or Firm—Kenyon & Kenyon

(57) ABSTRACT

A fuel injector (1), especially an injector for fuel injection systems of internal combustion engines (51), has a piezoelectric or magnetostrictive actuator (14), a valve-closure member (8) that is actuated by an actuator (14) using a valve needle (9), the valve-closure member cooperating with a valve seat surface (7) to form a sealing seat, and having at least one spray-discharge opening (10, 11) that is sealed by the sealing seat. In this context, the valve seat surface (7) and/or the valve-closure member (8) has partial areas (30a, 30b) that are arranged so as to be offset on the circumference, the partial areas throttling a fuel flow to differing extents as a function of a stroke of the valve needle (9).

9 Claims, 3 Drawing Sheets

FUEL INJECTION VALVE

FIELD OF THE INVENTION

The present invention relates to a fuel injector.

BACKGROUND INFORMATION

German Published Patent Application No. 40 05 455 describes a fuel injector that includes a piezoelectric actuator and a valve-closure member that can be actuated by a valve needle, the valve-closure member cooperating with a valve seat surface to form a sealing seat. The valve-closure member contacts an annular sealing point on the valve seat surface, as a result of which a spray-discharge opening is sealed. When the actuator is actuated, the valve-closure member lifts off from the valve seat surface, as a result of which the sealing seat is opened and fuel is spray-discharged from the fuel injector. In this context, the flow of spray-discharged fuel is rotationally symmetrical with respect to a valve axis. Thus the fuel is spray-discharged in a rotationally symmetrical spray cone.

One disadvantage in the fuel injector described in German Published Patent Application No. 40 05 455 is that it is not possible to specify a directional distribution of the spray-discharged fuel. As a result, it is impossible in the known fuel injector to achieve a controlled non-homogeneous fuel distribution in the combustion chamber of an internal combustion engine.

In German Published Patent Application No. 44 34 892, a fuel injector is described that has two spray-discharge openings situated at varying levels with respect to a valve axis. In this manner, the fuel is spray-discharged in two discharge directions, which include varying angles with respect to the valve axis.

One disadvantage in the fuel injector described in German Published Patent Application No. 44 34 892 is that the two spray-discharge directions are fixedly prescribed by the design. In addition, the relationship of the fuel streams flowing through the two spray-discharge openings is prescribed by the design and cannot be controlled, especially during the operation of the fuel injector.

SUMMARY OF THE INVENTION

In contrast, the fuel injector according to the present invention has the advantage that it is possible to control the fuel streams of fuel jets emerging in different spray-discharge directions, and their relationship to each other.

It is advantageous if, for throttling the fuel, partial areas are provided directly at the spray-discharge opening so as to be offset on the periphery of the valve seat surface and/or the valve-closure member. In this manner, particularly effective throttling is provided.

In addition, it is advantageous if a partial area has a raised area configured on the valve seat surface and/or on the valve-closure member. As a result, when the sealing seat is opened by a first stroke of the valve needle, the fuel flow in the fuel jet throttled by the raised area is powerfully throttled in comparison to the unthrottled fuel jet. When the sealing seat is opened by a second, larger stroke of the valve needle, the throttle effect generated by the raised area is reduced, as a result of which the fuel flow of the throttled fuel jet adjusts to the fuel flow of the unthrottled fuel jet.

It is also advantageous if the valve-closure member, for the purpose of creating an interstitial space, tapers to a blunter end than the valve seat surface, so that interstitial space, with the exception of the throttling partial areas, essentially widens radially. In this way, in response to a small stroke of the valve needle, a larger fuel flow is achieved, as result of which the difference between the throttled and the unthrottled fuel jets increases.

It is also advantageous if the valve-closure member contacts a sealing point on the valve seat when the fuel injector is closed, the sealing point being configured, with respect to the direction of flow, either downstream or upstream of the throttling partial areas, it being especially advantageous if the sealing surface is situated essentially in a plane oriented perpendicular to a valve axis. As a result, the sealing effect is not achieved on the throttling partial areas; in particular, when the fuel injector is closed, the valve-closure member in the partial areas does not contact the valve seat surface, as a result of which a reliable closing of the valve is assured. In addition, the sealing surface is easy to realize in this manner.

DETAILED DESCRIPTION

Figure 1:
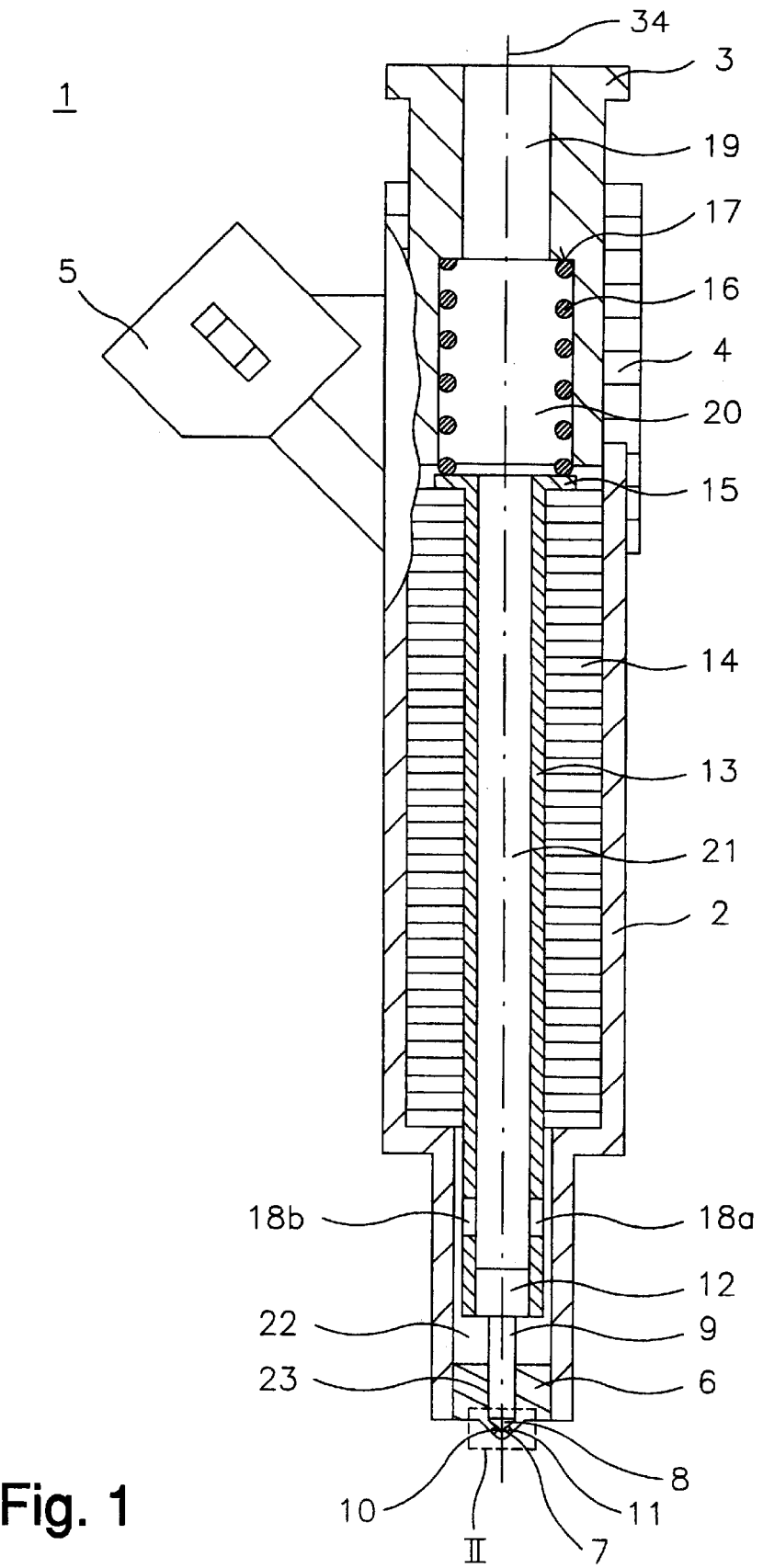
FIG. 1 depicts an axial section of an exemplary embodiment of a fuel injector according to the present invention.

FIG. 1 depicts, in a partial axial cutaway representation, a fuel injector 1 according to the present invention. Fuel injector 1 is used especially for directly injecting fuel, especially gasoline, into a combustion chamber of a mixture-compressing, spark-ignited internal combustion engine, as a so-called gasoline direct injector. However, fuel injector 1 according to the present invention is also suited for other application cases.

Fuel injector 1 has a valve housing 2, which is joined to a fuel intake feed pipe 3, valve housing 2 and fuel intake feed pipe 3 being surrounded in one segment by a plastic element 4. On plastic element 4, an electrical terminal 5 is configured, which can connect an electrical supply line to fuel injector 1. On valve housing 2, a valve seat body 6 is mounted, which has a valve seat surface 7, which cooperates with a valve-closure member 8 to form a sealing seat. Valve-closure member 8 is configured as a truncated cone tapering in the spray-discharge direction. In this configuration, fuel injector 1 is executed as an inward-opening fuel injector 1. Valve-closure member 8 is actuated by a valve needle 9, which in the depicted exemplary embodiment is configured as a single piece including valve-closure member 8. Valve seat body 6 has spray-discharge openings 10, 11, through which the fuel is spray-discharged from fuel injector 1.

Valve needle 9 has a cylindrical segment 12, which is connected to a tubular sleeve 13. Sleeve 13 is surrounded over one segment by a piezoelectric or magnetostrictive actuator 14, a collar 15 of sleeve 13 gripping actuator 14 from behind. Actuator 14 is supported, on the one hand, on valve housing 2, and, on the other hand, on collar 15 of sleeve 13. Using a compression spring 16, which acts upon collar 15 of sleeve 13, actuator 14 is biased. In this context, compression spring 16 is supported on a stop face 17, which is configured on fuel intake feed pipe 3. In order to permit the fuel to flow through, sleeve 13 has cavities 18a, 18b.

To actuate fuel injector 1, actuator 14 is acted upon by an electrical control signal, as result of which the actuator expands in opposition to the force of compression spring 16 and sleeve 13 moves in the direction of fuel intake feed pipe 3. In this manner, valve-closure member 8 of valve needle 9 is lifted off from valve seat surface 7 of valve seat body 6, as result of which the sealing seat formed by valve-closure member 8 and valve seat surface 7 is opened. Fuel travels into spray-discharge opening 10, 11 through the gap that arises between valve-closure member 8 and valve seat surface 7, as result of which the fuel is spray-discharged from fuel injector 1. In this context, fuel is supplied from fuel intake feed pipe 3 through an interior cavity 19 in fuel intake feed pipe 3, a compression spring space 20, an interior cavity 21 of tubular sleeve 13, and cavities 18a, 18b, into a fuel chamber 22. Via an interstitial space 23 formed between valve needle 9 and valve seat body 6, fuel is supplied from fuel chamber 22 to the sealing seat formed by valve-closure member 8 and valve seat surface 7. Interstitial space 23 can be created, e.g., by grooves configured on valve needle 9 or valve seat support 6.

Figure 6:
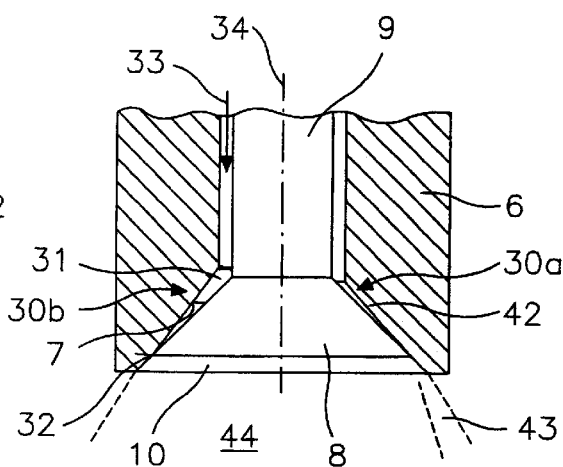
FIG. 6 depicts a detail of a fuel injector according to the present invention in accordance with a further exemplary embodiment.
Figure 7:
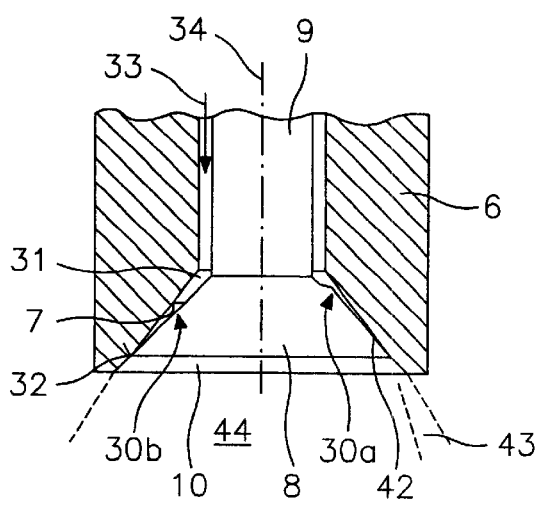
FIG. 7 depicts a detail of a fuel injector according to the present invention in accordance with a further exemplary embodiment.

Valve seat surface 7 and/or valve-closure member 8 on their peripheries have partial areas arranged so as to be offset, the partial areas throttling a fuel flow to different extents as a function of a stroke of valve needle 9. This can be seen in the detail shown in FIGS. 2 through 7. In this context, FIGS. 2 through 5 depict different embodiments of the section designated as II in FIG. 1, and FIGS. 6 and 7 depict further embodiments for an outward-opening fuel injector. Elements already described are provided with corresponding reference numerals, so that no repeated description is necessary.

Figure 2:
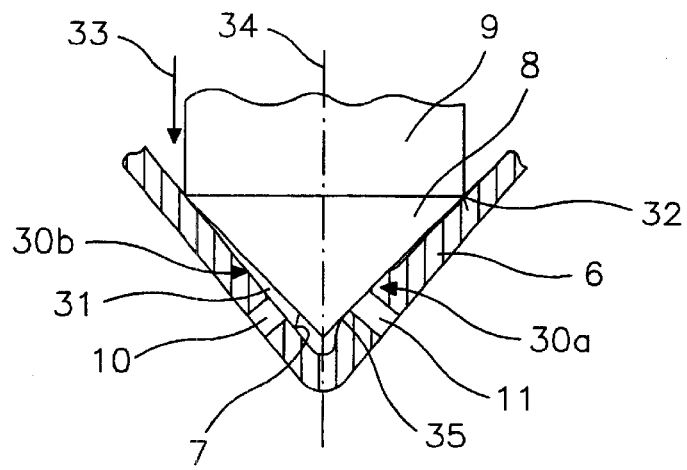
FIG. 2 depicts the detail designated as II in FIG. 1 in the closed state of the fuel injector.

In the exemplary embodiment depicted in FIG. 2, valve seat body 6 has different partial areas 30a and 30b. In this context, valve-closure member 8, for the purpose of creating an interstitial space 31, tapers to a blunter end than valve seat surface 7, so that interstitial space 31, with the exception of partial area 30a, widens radially toward valve axis 34. To assure a reliable closing of fuel injector 1, partial areas 30a, 30b do not contact valve-closure member 8. At a circular sealing point 32, valve-closure member 8 contacts valve seat surface 7 of valve seat body 6, the sealing point being configured, with respect to a direction of flow 33, upstream of partial areas 30a, 30b. In this context, sealing point 32 is situated on a plane essentially oriented perpendicular to valve axis 34. Partial area 30a has a raised area 35 configured on valve seat surface 7. In this context, raised area 35, and partial area 30a, are provided directly at spray-discharge opening 11.

Figure 3:
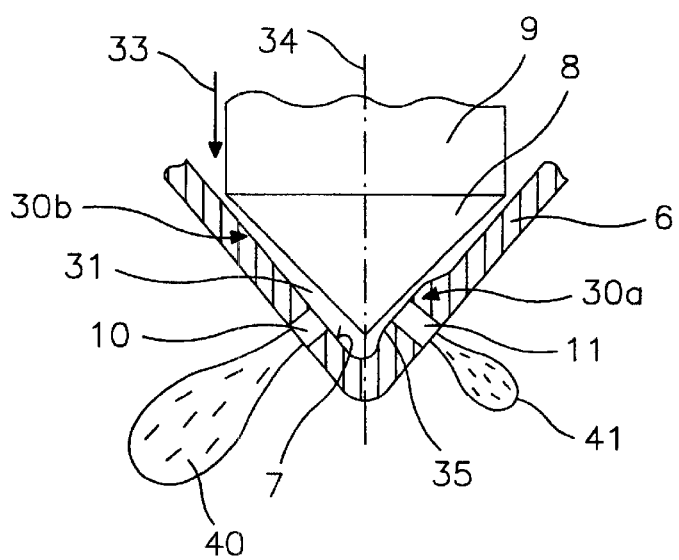
FIG. 3 depicts the detail designated as II in FIG. 1 in response to a first stroke of the valve needle.

In FIG. 3, valve-closure member 8 of valve needle 9 is actuated by a first stroke of valve needle 9. In this manner, fuel travels into interstitial space 31, from which it is spray-discharged through spray-discharge opening 10. A first fuel jet 40 is generated by the fuel flowing through spray-discharge opening 10. In addition, fuel travels into spray-discharge opening 11, as result of which a flow of fuel is generated through spray-discharge opening 11, creating a second fuel jet 41. As a result of raised area 35 in partial area 30a, the fuel flow through spray-discharge opening 11 is throttled to greater extent than the fuel flow through spray-discharge opening 10, as result of which fuel jet 41 is configured so as to be significantly smaller than fuel jet 40. Therefore, more fuel is spray-discharged through spray-discharge opening 10 than through spray-discharge opening 11.

Figure 4:
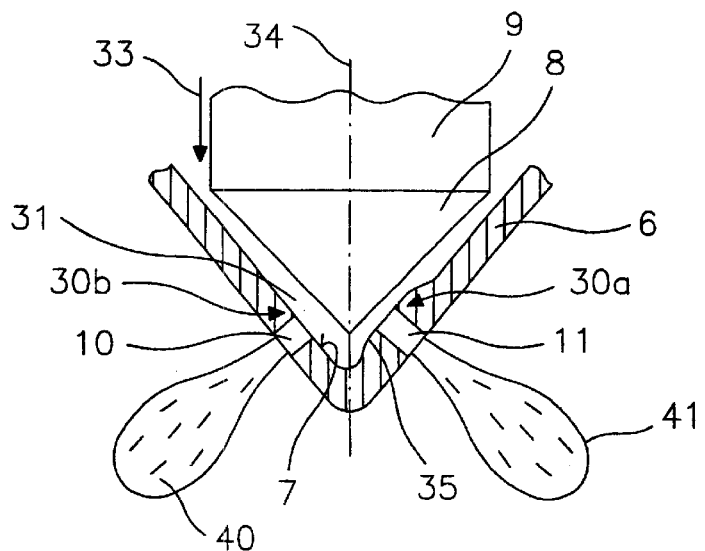
FIG. 4 depicts the detail designated as II in FIG. 1 in response to a second, larger stroke of the valve needle.

In FIG. 4, valve-closure member 8 is actuated by a second stroke of valve needle 9, this stroke being greater than the first valve needle stroke. Valve-closure member 8 as a result distinctly lifts off from valve seat surface 7 also in partial area 30a, as a result of which the throttle effect of raised area 35 is reduced. Therefore, the fuel flow through spray-discharge opening 11 is comparable to the fuel flow through spray-discharge opening 10, as a result of which two comparable fuel jets 40, 41 are created. Therefore, the result is a spray-discharge of fuel from fuel injector 1 that is essentially symmetrical with respect to valve axis 34.

Since the variable stroke of valve needle 9 can be adjusted using piezoelectric or magnetostrictive actuator 14, a range of intermediate settings of the application cases depicted in FIGS. 2, 3, and 4 can be achieved. Therefore, by varying fuel jets 40, 41, the fuel quantity distribution of fuel injector 1 can be varied in a controlled manner during operation.

Figure 5:
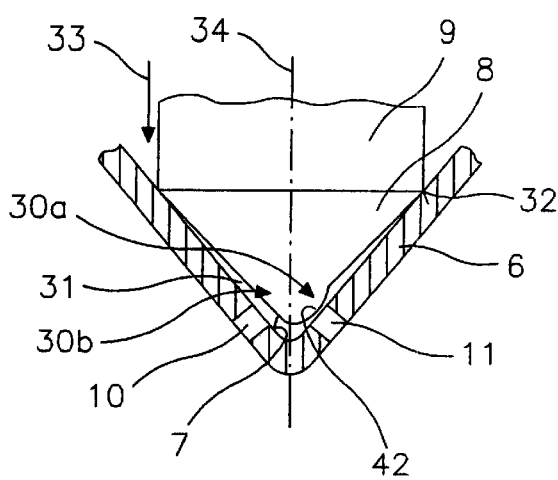
FIG. 5 depicts the detail designated as II in FIG. 1 in an alternative embodiment.

In FIG. 5, a further embodiment of fuel injector 1 according to the present invention is depicted. In this exemplary embodiment, valve-closure member 8 has a partial area 30a including a raised area 42. Valve seat surface 7 of valve seat body 6 is essentially configured so as to be conical. In partial area 30a, spray-discharge opening 11 is throttled, the variable throttling being achieved as a function of a stroke of valve needle 9. In this manner, spray-discharge openings 10, 11 are throttled to different extents, as a result of which a fuel quantity distribution of fuel injector 1, described in FIGS. 2 through 4, can be varied in a controlled manner.

FIG. 6 depicts an exemplary embodiment for an outward-opening fuel injector 1. Valve-closure member 8 is configured so as to widen in the spray-discharge direction. Valve seat surface 7 has a partial area 30a, in which a raised area 42 is configured on valve seat surface 7 of valve seat body 6. The fuel injector has a spray-discharge opening 10, which is divided into a first spray-discharge area 43 and a second spray-discharge area 44. In this context, first spray-discharge area 43 is throttled by partial area 30a to a different extent than second spray-discharge area 44. Valve-closure member 8, for creating interstitial space 31, is configured so as to be blunter than valve seat surface 7, so that interstitial space 31 broadens radially in the direction of flow. Valve-closure member 8 contacts a sealing point 32 on valve seat surface 7, the sealing point, with respect to flow direction 33, being configured downstream of partial areas 30a and 30b and being situated essentially in a plane that is oriented perpendicular to valve axis 34.

In response to a stroke of valve needle 9, the fuel flow in second spray-discharge area 44 is initially greater than the fuel flow in first spray-discharge area 43. As the stroke of valve needle 9 is progressively increased, the influence of partial area 30a on the throttling of the fuel jet spray-discharged in first spray-discharge area 43 is decreased. As a result, the fuel flow in first spray-discharge area 43 is increasingly adjusted to the fuel flow in second spray-discharge area 44. Therefore, as a result of the stroke of valve needle 9, the fuel quantity distribution of the fuel spray-discharged from a fuel injector 1 can be controlled.

FIG. 7 depicts a further exemplary embodiment for an outward-opening fuel injector 1. In this exemplary embodiment, valve-closure member 8 has a partial area 30a, in which a raised area 42 is configured on valve-closure member 8. As a result, in a similar way to that described in FIG. 6, in spray-discharge areas 43, 44, the flow of fuel spray-discharged from fuel injector 1 is throttled to different extents.

Figure 8:
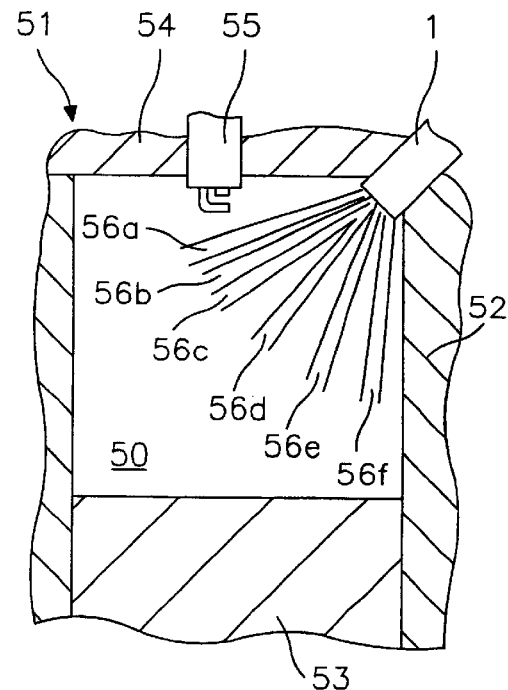
FIG. 8 depicts an application example of the fuel injector according to the present invention.

FIG. 8 depicts an application example in which fuel injector 1 according to the present invention is used for directly injecting fuel, especially gasoline, into combustion chamber 50 of an internal combustion engine 51. In the application example, fuel injector 1 has six spray-discharge openings arranged so as to be offset on the circumference. In addition, the valve seat surface and/or the valve-closure member according to the present invention have partial areas that are arranged so as to be offset on the circumference, the partial areas throttling the fuel flow to different extents as a function of a stroke of the valve needle. Fuel injector 1 is joined to cylinder 52 of internal combustion engine 51, a piston 53 being guided in cylinder 52 in a movable fashion. In a cylinder head 54, a spark plug 55 is mounted. When fuel injector 1 is actuated, fuel jets 56a through 56f emerge through the spray-discharge openings. In this context, the fuel flows of fuel jets 56a through 56c and those of fuel jets 56d through 56f are, in each case, throttled at least roughly to the same extent, the fuel flows of fuel jets 56a through 56c being throttled to different extent than the fuel flows of fuel jets 56d through 56f. In this context, the throttling is executed so that in response to a first valve needle stroke of fuel injector 1, fuel jets 56d through 56f are throttled more strongly than fuel jets 56a through 56c, so that the injection of fuel into combustion chamber 50 is essentially carried out in the area of spark plug 55. In response to a second, larger valve needle stroke of fuel injector 1, the fuel flows of fuel jets 56a through 56f are approximately equal, so that the fuel is distributed uniformly in combustion chamber 50 of internal combustion engine 51. In this manner, even in the very lean operation of internal combustion engine 51, an effective ignition of the injected fuel can be achieved. On the basis of the variable fuel quantity distribution, it is possible to react more effectively to the different demands of internal combustion engine 51, such as homogeneous operation/layered operation, cold start, full load/partial load.

Partial areas 30a, 30b, raised to varying extents in the different exemplary embodiments described, are formed, e.g., by stamping.

The present invention is not limited to the exemplary embodiments described. In particular, in the exemplary embodiments only the principle of variable throttling of the fuel flow is described. Therefore, the present invention is suited for any number of spray-discharge openings 10, 11, and for any configuration of them. In addition, the different throttling actions can also be achieved through suitable cavities in valve-closure member 8 or valve seat body 6.

What is claimed is:

1. A fuel injector, comprising:
   one of a piezoelectric actuator and a magnetostrictive actuator;
   a valve needle;
   a valve-closure member capable of being actuated by the one of the piezoelectric actuator and the magnetostrictive actuator in accordance with an operation of the valve needle; and
   a valve seat surface including at least two spray-discharge openings, the valve-closure member configured to cooperate with the valve seat surface to form a sealing seat that seals the at least two spray-discharge openings, wherein:
   at least one of the valve seat surface and the valve-closure member includes partial areas that are arranged so as to be offset on a circumference, and
   the partial areas throttle a fuel flow to differing extents through the spray-discharge openings as a function of a stroke of the valve needle.

2. The fuel injector according to claim 1, wherein:
   the fuel injector is for a fuel injection system of an internal combustion engine.

3. The fuel injector according to claim 1, wherein:
   at least one of the partial areas is arranged directly at one of the spray-discharge openings.

4. The fuel injector according to claim 1, wherein:
   the fuel flow is throttled to differing extents at at least two of the spray-discharge openings.

5. The fuel injector according to claim 1, wherein:
   at least one of the partial areas includes a raised area that is configured on at least one of the valve seat surface and the valve-closure member.

6. The fuel injector according to claim 1, wherein:
   in order to create an interstitial space, the valve-closure member tapers to a blunter end than the valve seat surface so that the interstitial space widens radially in a direction of flow.

7. The fuel injector according to claim 1, wherein:
   when the fuel injector is closed, the valve-closure member contacts a sealing point on the valve seat surface, and
   the sealing point is configured, with respect to a direction of flow, at a position that is one of downstream and upstream of the partial areas.

8. The fuel injector according to claim 7, wherein:
   the sealing point is situated essentially in a plane that is oriented perpendicular to a valve axis.

9. A fuel injector, comprising:
   one of a piezoelectric actuator and a magnetostrictive actuator;
   a valve needle;
   a valve-closure member capable of being actuated by the one of the piezoelectric actuator and the magnetostrictive actuator in accordance with an operation of the valve needle; and
   a valve seat surface with which the valve-closure member cooperates to form a sealing seat that seals a spray-discharge opening;
   wherein at least one of the valve seat surface and the valve-closure member includes partial areas that are arranged so as to be offset on a circumference;
   wherein the partial areas throttle a fuel flow to differing extents as a function of a stroke of the valve needle; and
   wherein the valve-closure member is arranged to contact a sealing point of the valve seat surface in a closed position of the fuel injector, the sealing point arranged, with respect to a direction of flow, at a position downstream of the partial areas.

* * * * *

UNITED STATES PATENT AND TRADEMARK OFFICE
CERTIFICATE OF CORRECTION

PATENT NO. : 6,631,854 B1
DATED : October 14, 2003
INVENTOR(S) : Hubert Stier et al.

It is certified that error appears in the above-identified patent and that said Letters Patent is hereby corrected as shown below:

Title page,
Item [57], ABSTRACT, delete "(1), (51), (14), (8), (14), (9), (7), (10,11), (7), (8), (30a, 30b), (9)"

Signed and Sealed this

Fifteenth Day of March, 2005

JON W. DUDAS
*Director of the United States Patent and Trademark Office*